(12) United States Patent
Merritt et al.

(10) Patent No.: US 6,984,319 B2
(45) Date of Patent: Jan. 10, 2006

(54) ENVIRONMENTALLY FRIENDLY ACID NEUTRALIZING FULL FLOW CARTRIDGE

(75) Inventors: Steven J. Merritt, Kearney, NE (US); Gene W. Brown, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 10/457,186

(22) Filed: Jun. 9, 2003

(65) Prior Publication Data

US 2003/0226793 A1 Dec. 11, 2003

Related U.S. Application Data

(60) Provisional application No. 60/387,240, filed on Jun. 7, 2002, and provisional application No. 60/387,235, filed on Jun. 7, 2002.

(51) Int. Cl.
*B01D 27/08* (2006.01)
*B01D 27/00* (2006.01)
*F01M 1/00* (2006.01)
*C10M 125/10* (2006.01)

(52) U.S. Cl. .................. 210/209; 210/206; 210/266; 210/287; 210/501; 210/416.5; 210/338; 210/259; 210/258; 184/6.24; 123/196 A

(58) Field of Classification Search ............ 210/209, 210/206, 266, 287, 501, 416.5, 338, 259, 210/258, 232, 168, 450; 184/6.24; 123/196 A
See application file for complete search history.

(56) References Cited

U.S. PATENT DOCUMENTS

| | | |
|---|---|---|
| 1,914,999 A | 6/1933 | Maverick et al. |
| 2,196,821 A | 4/1940 | Arnold |
| 2,411,539 A | 11/1946 | Gunn |
| 2,537,992 A | 1/1951 | Gross et al. |
| 2,601,404 A | 6/1952 | Lasky |
| 2,843,268 A | 7/1958 | Kennedy |
| 2,942,572 A | 6/1960 | Pall |
| 3,005,555 A | 10/1961 | Bosworth |
| 3,056,499 A | 10/1962 | Emond |
| 3,529,719 A | 9/1970 | Graybill |
| 4,075,097 A | 2/1978 | Paul |
| 4,075,098 A | 2/1978 | Paul et al. |
| 4,324,660 A | 4/1982 | Peyton et al. |
| 4,336,042 A | 6/1982 | Frantz et al. |
| 4,501,660 A | 2/1985 | Hebert |

(Continued)

FOREIGN PATENT DOCUMENTS

| | | |
|---|---|---|
| EP | 0287527 A2 | 10/1988 |
| EP | 0 416 908 A2 | 3/1991 |
| GB | 507064 | 6/1939 |
| GB | 836993 | 6/1960 |
| GB | 2390828 A | 1/2004 |
| WO | WO 86/03687 A1 | 7/1986 |
| WO | WO 96/20368 | 7/1996 |

*Primary Examiner*—Thomas M. Lithgow
(74) *Attorney, Agent, or Firm*—Leydig, Voit & Mayer, Ltd.

(57) ABSTRACT

An environmentally friendly acid neutralizing filter cartridge is adapted to be mounted in a cartridge mounting body of an engine oil circuit for filtering particulates and neutralizing acid in oil. The filter cartridge comprises a support housing that comprises substantially no metal parts such that the filter cartridge can be readily incinerated. A full flow particulate filter and a bypass particulate filter are arranged in the support housing. A bed of acid neutralizing particles is contained in the support housing. The housing is configured such that a predetermined primary flow path is defined through the filter cartridge that passes through the full flow particulate filter and bypassing the bed of acid neutralizing particles; and a predetermined bypass path is defined through the filter cartridge that passes, in sequence, through the bed of acid neutralizing particles and the bypass particulate filter.

46 Claims, 11 Drawing Sheets

U.S. PATENT DOCUMENTS

| | | | |
|---|---|---|---|
| 4,557,829 A | 12/1985 | Fields | |
| 4,655,914 A | 4/1987 | Wada | |
| 4,733,449 A | 3/1988 | Spearman | |
| 4,751,901 A | 6/1988 | Moor | |
| 4,802,979 A | 2/1989 | Medley, III | |
| 4,832,836 A | 5/1989 | Selsdon | |
| 4,872,976 A | 10/1989 | Cudaback | |
| 4,906,389 A | 3/1990 | Brownawell et al. | |
| 4,946,485 A | 8/1990 | Larsson | |
| 5,042,617 A | 8/1991 | Brownawell et al. | |
| 5,049,269 A | 9/1991 | Shah | |
| 5,068,044 A | 11/1991 | Brownawell et al. | |
| 5,069,799 A | 12/1991 | Brownawell et al. | |
| 5,078,877 A | 1/1992 | Cudaback et al. | |
| 5,089,131 A | 2/1992 | Gentry | |
| 5,112,482 A | 5/1992 | Shaub et al. | |
| 5,180,490 A | 1/1993 | Eihusen et al. | |
| 5,225,081 A | 7/1993 | Brownawell et al. | |
| 5,234,585 A | 8/1993 | Zuk | |
| 5,236,579 A | 8/1993 | Janik et al. | |
| 5,236,595 A | 8/1993 | Wang et al. | |
| 5,342,511 A | 8/1994 | Brown et al. | |
| 5,447,627 A | 9/1995 | Loafman et al. | |
| 5,459,074 A * | 10/1995 | Muoni | 436/60 |
| 5,490,930 A | 2/1996 | Krull | |
| 5,525,226 A | 6/1996 | Brown et al. | |
| 5,527,452 A | 6/1996 | Grigoriev et al. | |
| 5,527,463 A | 6/1996 | Morgan | |
| 5,538,542 A | 7/1996 | Watanabe et al. | |
| 5,538,543 A | 7/1996 | Watanabe et al. | |
| 5,562,746 A | 10/1996 | Raether | |
| 5,622,544 A | 4/1997 | Shamine et al. | |
| 5,660,802 A | 8/1997 | Archer et al. | |
| 5,685,985 A | 11/1997 | Brown et al. | |
| 5,695,637 A | 12/1997 | Jiang et al. | |
| 5,702,592 A | 12/1997 | Suri et al. | |
| 5,702,602 A * | 12/1997 | Brown et al. | 210/342 |
| 5,718,258 A | 2/1998 | Lefebvre et al. | |
| 5,718,743 A | 2/1998 | Donnelly et al. | |
| 5,738,785 A | 4/1998 | Brown et al. | |
| 5,772,881 A * | 6/1998 | Stockhowe et al. | 210/440 |
| 5,779,772 A | 7/1998 | Unger et al. | |
| 5,792,245 A | 8/1998 | Unger et al. | |
| 5,851,269 A | 12/1998 | Strope | |
| 5,888,383 A | 3/1999 | Cox | |
| 5,904,357 A | 5/1999 | Demirdogen et al. | |
| 5,906,736 A | 5/1999 | Bounnakhom et al. | |
| 5,996,810 A | 12/1999 | Bounnakhom et al. | |
| 6,024,229 A | 2/2000 | Ayers | |
| 6,045,693 A | 4/2000 | Miller et al. | |
| 6,235,194 B1 | 5/2001 | Jousset | |
| 6,322,697 B1 | 11/2001 | Hacker et al. | |
| 6,478,958 B1 | 11/2002 | Beard et al. | |
| 6,537,453 B2 | 3/2003 | Beard et al. | |
| 6,555,000 B2 | 4/2003 | Knight | |
| 2002/0043495 A1 * | 4/2002 | Beard et al. | 210/416.1 |

* cited by examiner

ENVIRONMENTALLY FRIENDLY ACID NEUTRALIZING FULL FLOW CARTRIDGE

CROSS-REFERENCE TO RELATED PATENT APPLICATIONS

This patent application claims the benefit of U.S. Provisional Patent Application No. 60/387,240, filed Jun. 7, 2002, and U.S. Provisional Patent Application No. 60/387,235 filed Jun. 7, 2002.

FIELD OF THE INVENTION

The present invention relates to a method and apparatus for neutralizing acid in fluid circulating systems. More particularly, the invention is directed toward an apparatus for removing acids from lubrication oil in oil circulating systems such as the oil systems associated with a diesel engine.

BACKGROUND OF THE INVENTION

Heavy duty diesel engine life, or time to rebuild, has historically been linked directly to piston ring, cylinder liner and/or crank shaft bearing life (referred to as "bearings" for sake of simplicity). Engine design parameters require that these engine components be lubricated, typically with a film lubricant of oil separating these engine components to prevent or minimize direct metal to metal contact. With oil lubricating these bearing surfaces, the principal mechanism associated with engine wear is not metal to metal contact or frictional wear. Instead the primary diesel engine wear component influencing engine life is corrosive wear caused by sulfur and nitrogen containing acids that are formed as products of combustion. One estimate is that more than 70% of heavy duty diesel engine wear is caused by such combustion acid metal corrosion.

Control of diesel engine corrosive wear has historically been accomplished through the inclusion of basic or alkaline chemicals dissolved or suspended in the engine oil that are used to rapidly neutralize combustion acid upon contact with the acid molecules. There have been proposals in the prior art to release alkaline or basic chemicals into the oil or otherwise neutralize acids utilizing a housing arranged along an oil circuit such as is disclosed in U.S. Pat. No. 5,459,074 to Muoni; U.S. Pat. No. 5,718,258 to Lefebvre et al.; U.S. Pat. No. 5,068,044 to Brownawell et al.; U.S. Pat. No. 5,069,799 to Brownawell et al.; U.S. Pat. No. 5,225,081 to Brownawell et al.

Any attempt at implementing acid neutralizing technology into a commercial practical engine oil circuit needs to accommodate several important factors while at the same time providing a sufficiently inexpensive filter cartridge for maintenance intervals to make it commercially practical for fleet managers and the like. As will be appreciated with an understanding of the present invention, these issues have not heretofore been adequately satisfied by the prior art.

BRIEF SUMMARY OF THE INVENTION

The present invention is directed toward an environmentally friendly acid neutralizing filter cartridge for mounting in a cartridge mounting body of an engine oil circuit for filtering particulates and neutralizing acid in oil. The filter cartridge comprises a support housing adapted to be mounted in the cartridge mounting body. The support housing comprises substantially no metal parts such that the filter cartridge can be readily incinerated. A full flow particulate filter and a bypass particulate filter are arranged in the support housing. A bed of acid neutralizing particles is contained in the support housing. The housing is configured such that a predetermined primary flow path is defined through the filter cartridge that passes through the full flow particulate filter and bypassing the bed of acid neutralizing particles; and a predetermined bypass path is defined through the filter cartridge that passes, in sequence, through the bed of acid neutralizing particles and the bypass particulate filter.

Another aspect of the present invention is directed toward an environmentally friendly acid neutralizing filter cartridge for filtering particulates and neutralizing acid in oil in which the environmentally friendly acid neutralizing filter comprising substantially no metal parts such that the support housing can be more completely incinerated. The filter cartridge comprises top and bottom nonmetallic end caps. A generally cylindrical full flow particulate filter is secured axially between the top and bottom end caps. A nonmetallic reactor body extends axially between the top and bottom end caps. The reactor body comprises a reactor chamber and a venturi conduit. The reactor chamber has at least one reactor inlet port and at least one reactor outlet port. The venturi conduit includes a constricted portion with the at least one outlet port arranged relative to the constricted portion such that when fluid flows through the venturi conduit, fluid is drawn through the at least one reactor outlet port. A bed of acid neutralizing particles is arranged in the reactor chamber between the at least one reactor inlet port and the at least one reactor outlet port. A second filter is arranged downstream of the bed of acid neutralizing particles for preventing acid neutralizing particles from exiting the filter cartridge during use.

Another aspect of the present invention is also directed toward an environmentally friendly acid neutralizing filter cartridge for filtering particulates and neutralizing acid in oil. The environmentally friendly acid neutralizing filter comprises substantially no metal parts such that the support housing can be more completely incinerated. The filter cartridge comprises top and bottom plastic end caps in which the bottom end cap defines a main outlet. A generally cylindrical full flow particulate filter has opposed ends potted into the top and bottom end caps respectively. A plastic reactor body also has opposed ends potted into the top and bottom end caps respectively. The plastic reactor body is arranged generally concentric within the generally cylindrical full flow particulate filter such that an annular collection chamber is defined therebetween. The plastic reactor body includes an annular outer wall portion, a central tube portion arranged generally concentric inside the annular outer wall portion to provide a reaction chamber, and a spacer portion. The central tube portion has a top opening spaced axially from the top end cap and a bottom opening communicating with the main outlet. The spacer portion defines a radially extending fluid passageway connecting the annular collection chamber with the top opening. The annular outer wall portion defines at least one reactor inlet port, and the central tube portion defines at least one reactor outlet port. A constricted portion is arranged along the central tube portion with the at least one reactor outlet port arranged along the constricted portion such that when fluid flows through the center tube portion, fluid is drawn through the at least one outlet port. A bed of acid neutralizing particles is contained in the reactor chamber between the at least one reactor inlet port and the at least one reactor outlet port. Also, a bypass filter is arranged in reaction chamber between the bed of acid neutralizing particles and the at least one reactor outlet port.

Other aspects, objectives and advantages of the invention will become more apparent from the following detailed description when taken in conjunction with the accompanying drawings.

DETAILED DESCRIPTION OF THE INVENTION

Figure 1:
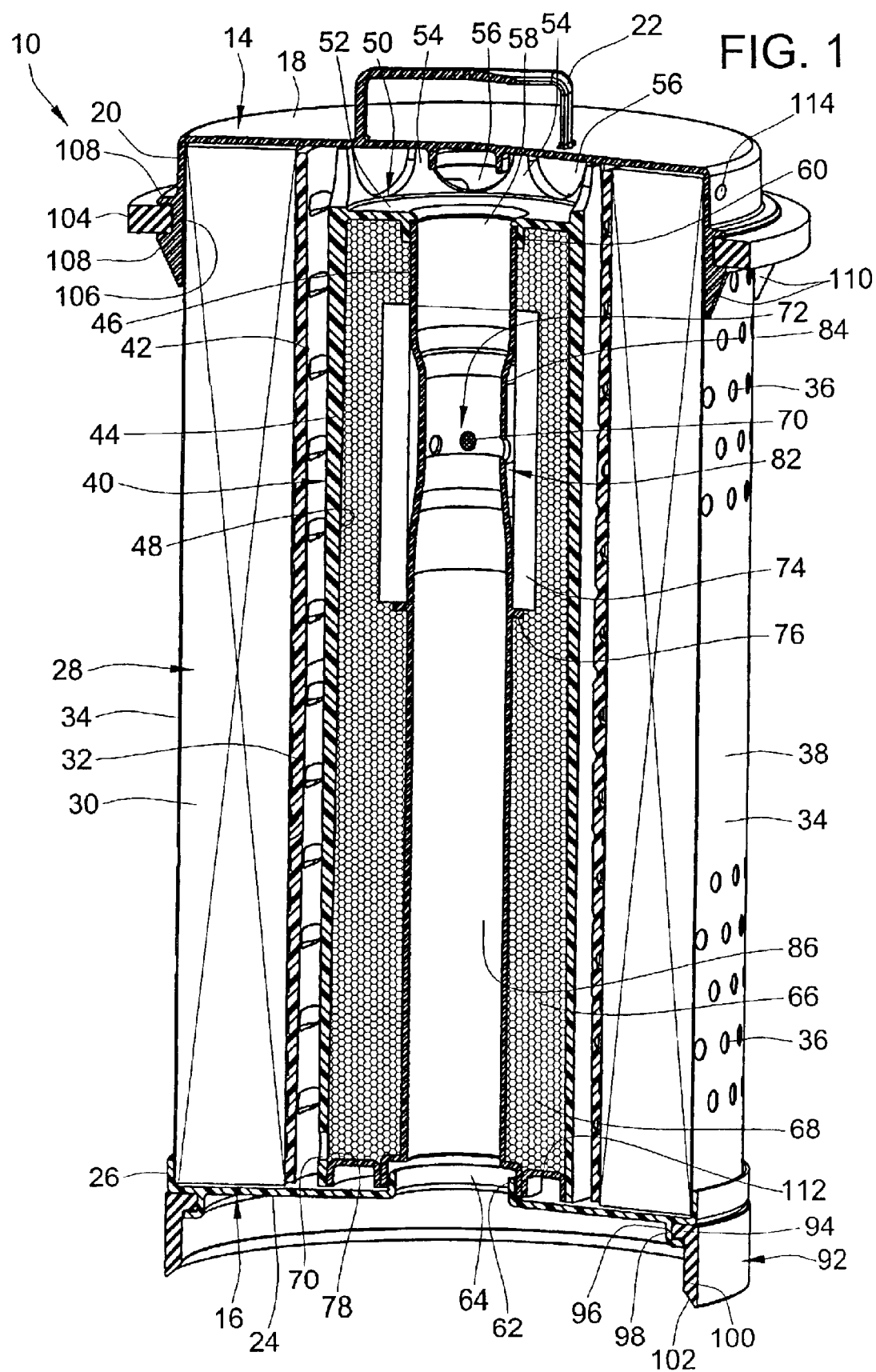
FIG. 1 is a cutaway isometric view of an environmentally friendly acid neutralizing full flow filter cartridge in accordance with a preferred embodiment of the present invention.

Referring to FIG. 1, an environmentally friendly acid neutralizing full flow filter cartridge 10 is illustrated in accordance with a preferred embodiment of the present invention. The filter cartridge 10 is adapted to be installed in a suitable cartridge mounting body 12 that may be positioned along an engine oil circuit that will be later described.

Referring to the filter cartridge shown in FIG. 1, the support housing or structural components for the filter cartridge are made with substantially no metal support parts such that the filter cartridge can be more completely incinerated for relatively complete disposal of spent filter cartridges. The filter cartridge 10 includes top and bottom end caps 14, 16 that are made of non-metallic material such as injection molded plastic or other suitable non-metallic material. The top end cap includes a plate or cover portion 18 and a downwardly depending radial skirt 20. Preferably a handle 22 is integrally provided along the top surface of the top end cap 14 to facilitate easy grasping and removal and insertion of the filter cartridge into the cartridge mounting body 12 during maintenance service intervals. The bottom end cap also includes a generally plate-shaped portion 24 and an upwardly extending outer peripheral cylindrical skirt 26. The top and bottom end caps generally encapsulate the ends of the filter cartridge and provide end supports for other filter components extending therebetween.

A full particulate filter element 28 is arranged axially between the top and bottom end caps 14, 16. the full flow particulate filter element 28 includes a cylindrical tube of filter media 30 which may be pleated filter paper media, a depth filtration tube, synthetic filter media, glass filter media or a blend thereof, or other suitable filter media. In the disclosed embodiment, the top and bottom ends of the cylindrical tube of filter media 38 are potted to the top and bottom end caps 14, 16 with suitable potting material such as plastisol, epoxy, urethane, hot melt or other suitable bonding material. The filter element 28 also includes a perforated inner plastic center tube 32 that extends the axial length of the filter media 30 between top and bottom end caps 14, 16. The plastic center tube is concentrically arranged along the inner cylindrical periphery of the filter media 30 and provides support to the tube of filter media 30. Also, the filter element 28 preferably includes an outer cylindrical wrapper 34 that also extends axially the length of the tube of filter media 30 between top and bottom end caps 14, 16. The wrapper 34 generally protects the outer peripheral surface of the tube of filter media 30 and may provide some additional support. The wrapper includes a plethora of perforations or holes 36 to allow oil to pass through the filter element 28. Preferably, there is a notable absence of holes in a middle segment 38 of the wrapper such that incoming oil jetted into the cartridge mounting body 12 when the filter cartridge is installed does not impact directly upon the pleated filter paper media 30. Concentrically arranged within the full flow particulate filter element 28 is an acid neutralizing reactor 40. The reactor 40 is a generally cylindrical object that also extends axially between top and bottom end caps 14, 16 and is potted thereto with the same potting compound used to pot the filter element 28. The outer periphery of the acid neutralizing reactor 40 is spaced from the inner periphery of the full flow particulate filter element 28 such that a cylindrical collection chamber 42 is defined therebetween. The reactor 40 comprises two primary structural components including an outer reactor housing 44 and a venturi conduit which is provided herein by an inner venturi tube 46. The reactor housing includes a generally cylindrical side wall 48 that extends substantially the axial length between end caps 14, 16. However, near the top end, the sidewall 48 is integrally formed with an axial spacer body 50 that engages the top end cap 14. The spacer body 50 includes a generally planar end wall 52 that is spaced from the cover portion of the top end cap 14 via axially projecting tabs 54. Between the tabs 54, the spacer body 50 defines radial through ports that communicate oil through the top end of the reactor housing 44. The planar end wall 52 also includes a central opening 58 which is surrounded by an annular retaining wall structure 60. The top end of the venturi tube is secured to the outer reactor housing 44 with the annular retaining wall structure 60 either by mechanically or chemically welding the components together to provide a seal that prevents fluid from short circuiting therethrough. Thus, the inner venturi tube 46 is arranged concentrically within the outer reactor housing 44 and extends the axial length of the filter cartridge. The bottom end of the venturi tube 46 is installed over a cylindrical snout projecting upwardly from the bottom end cap 16. The potting material used in the bottom end cap secures the end of the venturi tube 46 to the annular snout 62 and/or plate portion 24 of the bottom end cap to prevent oil from short circuiting therebetween. The cylindrical snout 62 defines a central opening 64 that provides the main outlet port for the filter cartridge.

With the venturi tube 46 concentrically arranged within the outer reactor housing 44, a generally cylindrical reactant chamber 66 is defined therebetween. As shown herein, the reactant chamber is filled with a bed of acid neutralizing particles 68 which primarily comprise calcium carbonate material, which may be provided by crushed limestone particles or other suitable yet inexpensive acid neutralizing media to provide a commercially practical filter. The crushed limestone particles 68 provide a very inexpensive compound as it occurs naturally and is readily available from limestone deposits (limestone technically is a naturally occurring substance that primarily comprises calcium carbonate, but may also include magnesium carbonate and/or other trace minerals or materials). The limestone particles 68 are crushed to be fine enough to provide a large surface area for calcium carbonate molecules to interact with acid molecules in the oil, while at the same time not being too fine so as to impede, block or prevent flow of oil altogether through the reactor chamber 66. As oil flows through the reactor chamber 66 acid molecules contained within the oil will come into the contact with the outer surface of the limestone particles 68 and thereby will react with the calcium carbonate contained therein and thereby cause a reaction to take place in which the acid molecule is neutralized. This effectively reduces the amount of acid molecules in the oil thereby reducing the corrosive wear on the bearings or other similar metal surfaces of the engine, and can also provide for a prolonged maintenance service interval for an oil change.

To provide for flow of oil through the reactant chamber 66 the reactor body includes one or more inlet ports 70 provided in the outer cylindrical sidewall 48 and one or more outlet ports 72 for communicating acid neutralized oil into the venturi tube 46.

In addition, means is provided to prevent the crushed limestone particles and fines contained therein from entering the oil system of the engine. One such means provided herein is a bypass particulate filter element 74 that is arranged in fluid series between the bed of crushed limestone particles 68 and the venturi tube 46. The bypass filter 74 is a generally cylindrically member that surrounds the outlet ports 72 such that the bypass particulate filter 74 is arranged to filter out limestone particles or fines contained in oil and prevent exit of such limestone particles or fines into the venturi tube. The bypass filter 74 may comprise a relatively fine felt type material having a porosity smaller than that of the crushed limestone particles or fines contained therein and may only extend part of the axial length of the reactant chamber 66. Alternatively, the bypass filter 74 can be of the conventional pleat-type filter paper media or can be a depth filtration tube, or other suitable filtering media. As shown herein, a radial retention shoulder 76 integral with the venturi tube 46 and projecting readily outward therefrom supports and retains one axial end of the cylindrical bypass filter 74.

Preferably, the inlet ports 70 are axially spaced from the outlet ports a substantial length of the reactant chambers such that oil entering the reactant chamber has a long winding path to flow through in order to flow through the reactant chamber. This provides for more effective acid neutralizing activity with smaller amounts of acid neutralizing medium and a smaller overall bed size. As shown herein, this is accomplished by placing the inlet ports 70 to the reactant chamber 66 approximate the bottom end cap 36 and the outlet ports 72 for the venturi tube approximate the end wall 52 of the spacer body 50. Other than the inlet ports 70 the outer sidewall 48 of the reactor housing 44 is generally solid so as to maintain a relatively long flow path for oil through the reactant chamber 66 and the bed of acid neutralizing particles 68.

To further prevent acid neutralizing limestone particles 68 from exiting the reactant chamber 66, preferably mesh screened material 78 is integrally molded into the sidewall 48 of the outer reactor housing 44 over the inlet ports 70 to prevent limestone particles and the fines from entering the cylindrical collection chamber 42 when the filter is sitting idle (which could allow particles to be flushed through the venturi tube and exit the filter which would be undesirable). Similarly, preferably the venturi outlet tube is integrally molded with mesh materials 80 over the outlet ports 72 so as to provide a backup for the bypass filter 74 to better ensure that fines or acid neutralizing limestone particles 68 do not exit the filter cartridge 10. Thus, the additional of mesh screen material provides further means or alternative means to prevent crushed limestone particles and fines contained therein from entering the oil system of an engine.

The venturi tube 46 includes a narrowed neck section which provides a constriction 82 thereby forming a venturi section along the venturi conduit. The outlet ports 72 are arranged relative to the constriction 82 in a strategic location along the narrow neck area 84 such that when fluid flows through the venturi conduit, fluid is drawn through the outlet ports 72 via the venturi effect. Specifically, the main force that propels oil through the reactor is oil pressure. As the main stream of oil passes through the venturi or narrowed neck section, the oil is accelerated. The increase in the velocity creates a low pressure area near the one or more outlet holes formed in the venturi tube 46. This pressure differential provides the necessary driving force. The venturi tube 46 defines an internal elongated axial passage 86 which connects the cylindrical collection chamber 42 (through the spacer body 50) and also the outlet ports 72 of the reactor chamber 66 to the main outlet 64 of the filter cartridge 10 to allow for exit of filtered oil and acid neutralized oil from the filter cartridge.

Figure 11:
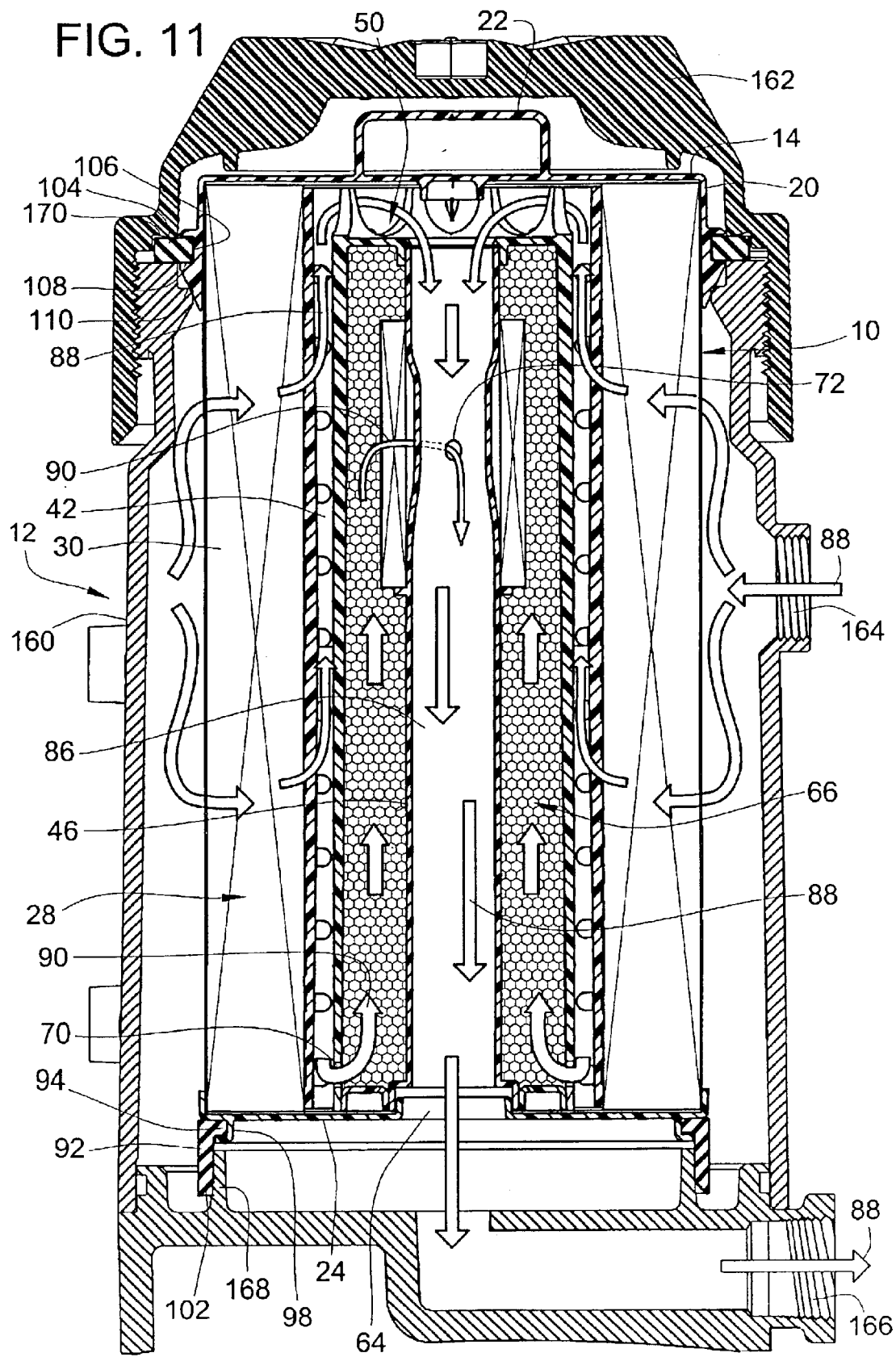
FIG. 11 is a cross section of the filter cartridge as installed in a reusable cartridge mounting body of an engine oil circuit.

With the foregoing arrangement of filter components, a primary flow path and a secondary bypass flow path are formed through the filter cartridge as illustrated in FIG. 11 and referring to FIG. 1. As shown with arrows, the primary flow path 88 passes through the outer cylindrical full flow particulate filter element 28, is collected in the cylindrical collection chamber 42, passes through the spacer body 50 of the reactor housing and passes through the axial passage 86 of the venturi tube for exit through the main outlet 64 of the filter cartridge 10. The bypass flow path 90 also similarly passes through the full flow particulate filter element 28 and is collected in the cylindrical collection chamber 42. However, the bypass flow path 90 passes through the reactor chamber and bed of acid neutralizing limestone particles 68 contained therein via the inlet and outlet ports 70, 72. As noted above, the axial spacing of the inlet and outlet ports 70, 72 provide substantial axial and radial components to the bypass flow path 90 portion through the acid neutralizing bed. Thereafter, oil along the bypass flow path 90 is joined with the primary flow path 88 in the venturi tube 46 and passes along to the main outlet 64.

Flow of oil through the reactant chamber 66 is greatly restricted such that substantially more oil flows along the primary flow path then along the bypass flow path 90. This is for two reasons. The first is that sufficient oil needs to jet through the venturi conduit provided by the venturi tube 46 in order to create the venturi effect for creating suction. Secondly, the acid neutralizing limestone particles 68 are preferably crushed to be sufficiently fine to provide a large surface area for acid neutralization. An inherent result is that the finely crushed particles also unfortunately provide a relatively large restriction and pressure drop which could otherwise impede flow of oil. With only a small amount of oil flowing through the acid neutralizing bed, an acceptable pressure drop is maintained across the filter cartridge generally. Thus, if the bed of acid neutralizing particles 68 were to become plugged or clogged, which could potentially occur with sludge or other contaminants becoming lodged within the bed, that still will not affect operation of the filter cartridge 10 as all of the oil is passing through the full flow particulate filter 28 for filtering out particulates and oil still flows freely along the primary flow path 88. In a preferred embodiment, the sizing of the inlet and/or outlet ports 70, 72 can readily be sized to provide for a maximum flow rate of oil along the bypass flow path 90. Preferably, oil flowing along the bypass flow path is about 10% of that of oil flowing along the primary flow path 88. However, it will be appreciated that the design may provide for a range of anywhere between about 5% and 20% of oil passing along the bypass flow path during operation.

To ensure that oil does not short circuit the filter cartridge, a bottom gasket 92 is provided that separates the unfiltered oil along the inlet side from the filtered oil exiting the main outlet 64 as shown in FIG. 1. The bottom gasket 92 is of the radial sealing type and includes an L-shaped configuration including a radially inward projection 94 that is trapped in a retaining structure 96 that provides an annular mounting groove 98 at the bottom end of the filter cartridge 10. The retaining structure 96 is integrally provided by the bottom end cap 16 along the bottom surface thereof. The bottom gasket 92 also includes an axially projecting cylindrical sealing flange 100 that is adapted to be pressed radially inward by virtue of the higher pressure along the outside of the filter cartridge 10 against the corresponding cylindrical sealing surface of the cartridge mounting body 12. The sealing flange 100 preferably terminates in conically shaped cam surface 102 that directs the flange radially outward over a corresponding solid sealing flange of the cartridge mounting body to provide for an interference fit.

At the top end of the filter cartridge 10 is provided a top end gasket 104. The top end gasket 104 is mounted in an annular groove 106 provided by a pair of radially outward projecting flange walls 108 integrally provided by the skirt portion 20 of the top end cap 14. The top end gasket 104 is configured to be an axial seal and is adapted to form a seal along its upper surface. Accordingly, the top end gasket 104 provides a radially outward projecting flange performing an axial seal against the cartridge mounting body 12. The top end gasket 104 thus prevents the ingress of foreign materials and also keeps the integral handle 22 relatively clean and relatively free of oil to provide for cleaner removal and insertion of the filter cartridge 10 during maintenance intervals.

Referring to FIG. 11, an example of a cartridge mounting body 12 for the filter cartridge 10 is illustrated. It is understood that the cartridge mounting body 12 is not part of the invention but shown to illustrate how the filter cartridge 10 can be implemented according to a preferred embodiment. The cartridge mounting body 12 generally includes a cast metal bowl or basin 160 which receives the filter cartridge 10. The open end of the basin 160 is enclosed via a top end cover 162 that may be threadingly screwed on to the basin 160. The basin 160 has an inlet passage 164 through its side and an outlet passage centrally located along its bottom end. Surrounding the outlet passage is a cylindrical wall that projects upwardly for providing a structure that can be sealed against. The filter cartridge 10 is installed into the mounting body 12 by axially sliding the filter cartridge 10 into the basin 160 while the top end cover 162 is removed from the basin 160. As the filter cartridge 10 slides down into position, the conical cam surface 102 of the bottom end gasket 92 engages the top surface of the cylindrical wall 168 and deflects radially outwardly around the cylindrical wall 168 such that the sealing flange 100 comes into radial sealing interference contact with the cylindrical wall 168. While in this position, the sealing flange 100 separates the inlet side or inlet passage 164 from the outlet side or outlet passage 166. Because the inlet passage will typically provide a higher pressure than that experienced at the outlet passage due to a pressure drop experienced across the filter cartridge 10, the higher pressure along the inlet side will tend to press the sealing flange 100 into radial sealing engagement with the cylindrical wall 168 of the cartridge mounting body. Another feature that helps guide insertion of the filter cartridge 10 is the provision of triangular protrusions 110 projecting radially outward from the skirt portion 20 of the top end cap 14 that are positioned just below the bottom flange wall 108. The triangular protrusions 110 are angled such that the triangular protrusions 110 facilitate and tend to center the filter cartridge 10 when it is being inserted into the mounting basin 160. Once the filter cartridge 10 is installed, the top end cover 162 is screwed back onto the basin 160 which causes axial engagement between a seal support ring portion 170 integrally defined by the top end cover 162. Again, the higher pressure experienced along the inlet side or the inlet passage 164 tends to exert an axial force on the top end gasket 104 to maintain it upward sealing engagement with the top end cover 162.

Figure 12:
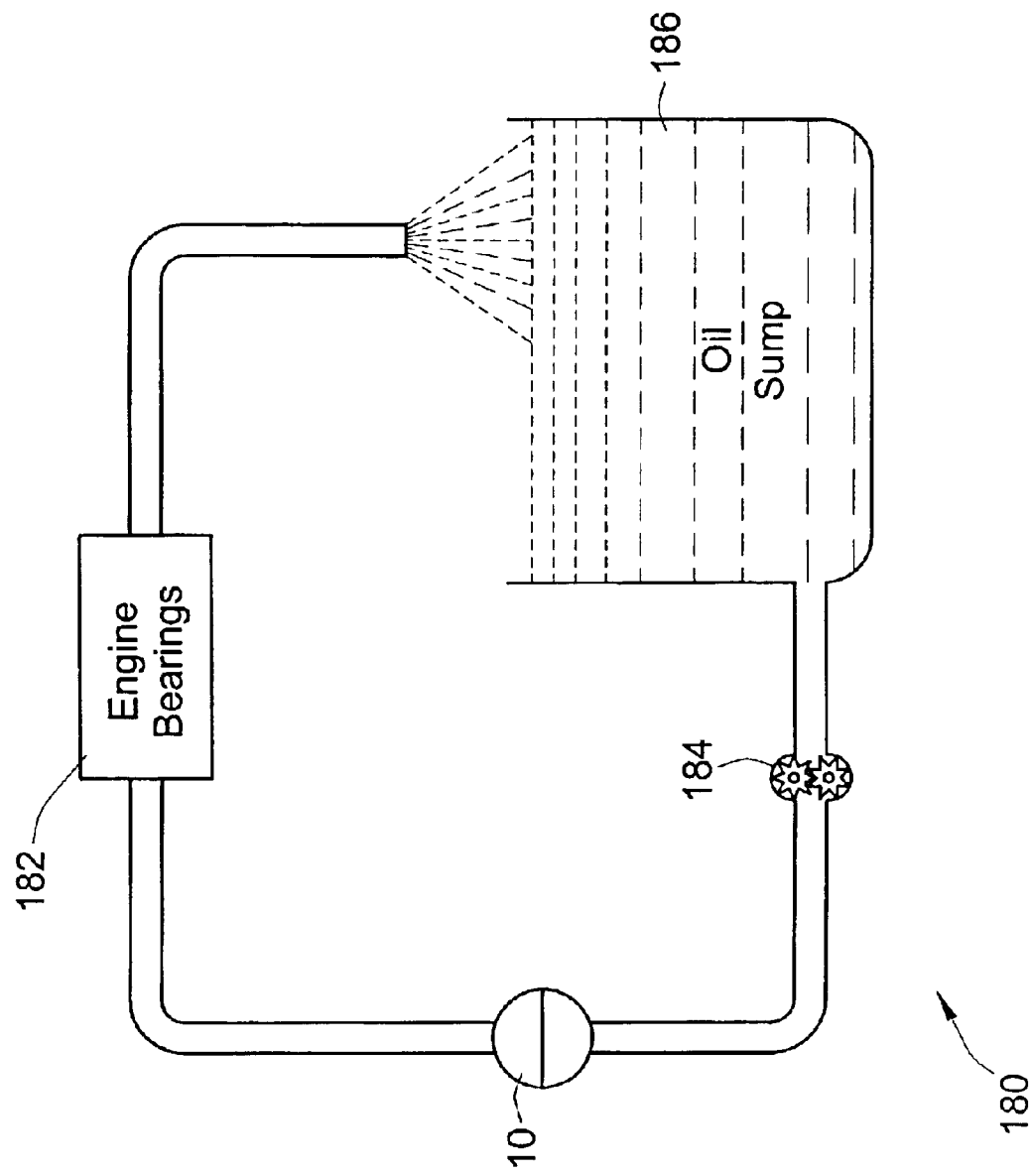
FIG. 12 is a schematic representation showing how the filter cartridge according to a preferred embodiment of the invention is installed in an engine oil circuit.

Referring to FIG. 12, the filter cartridge 10 of the present invention is adapted to be inserted into a cartridge mounting body 12 that is positioned along an oil circulation circuit upstream of engine bearings 182 as a full flow or full pass type filter. The entire flow generated by an oil pump is adapted to be flowed through the filter cartridge 10, then to the engine bearings 182 and then back to the engine oil sump 186. Even though the acid neutralizing reactor 40 and bed of acid neutralizing particles 68 are arranged along the oil circulation path leading directly to the bearings, importantly, not all of the oil flows through the acid neutralizing bed 68 and in fact most of the oil bypasses the acid neutralizing bed along the primary flow paths 88. Accordingly, smaller particles can be used in the acid neutralizing bed 68 to maximize effective surface area and acid neutralizing characteristics of the bed while at the same time not providing concerns about being overly restrictive or preventing oil flow to the engine bearings due to the fact that the primary oil path 88 bypasses the acid neutralizing bed and facilitates flow of oil to the engine bearings even if the bed of acid neutralizing particles 68 were to become clogged or overly restrictive.

Figure 2:
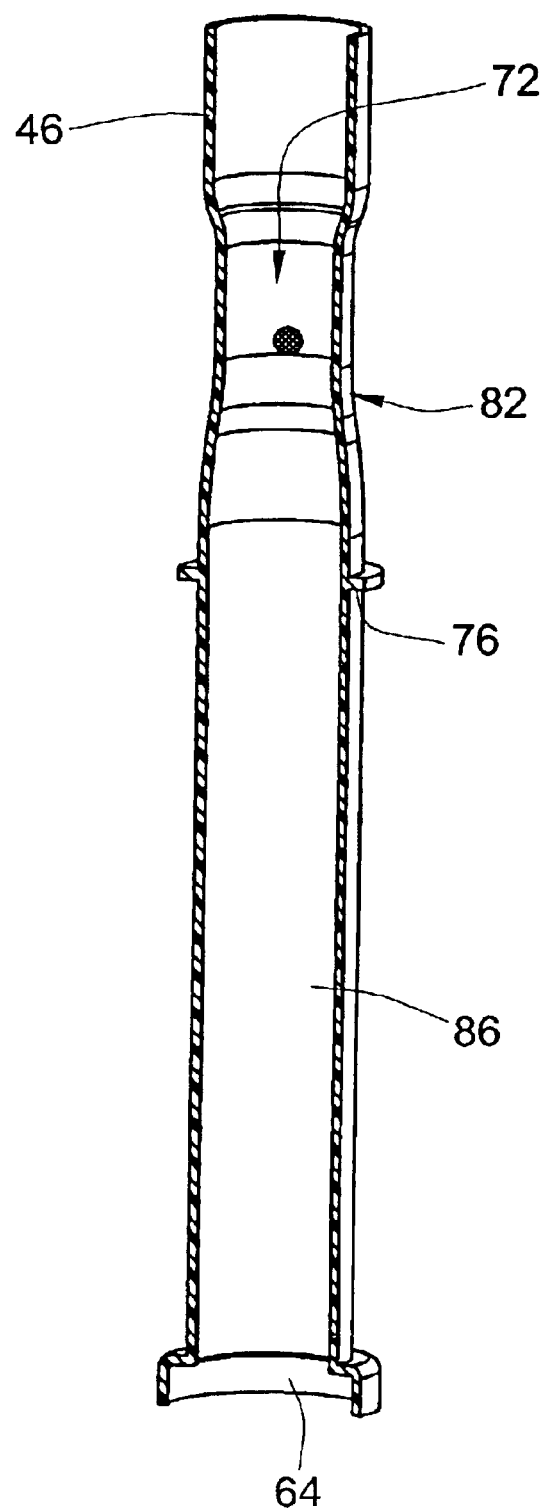
FIG. 2 is a cutaway isometric view of a venturi tube used in the filter cartridge shown in FIG. 1
Figure 3:
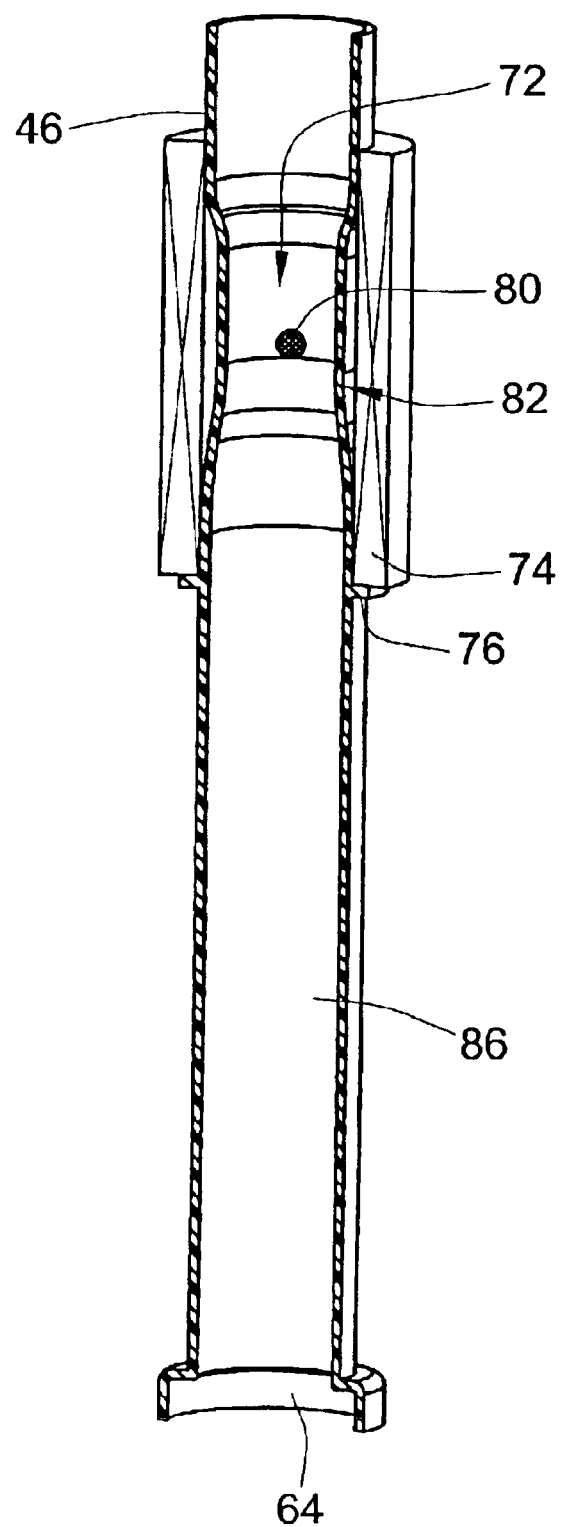
FIG. 3 is a cutaway isometric view of a bypass filter element installed on a venturi tube used in the filter cartridge shown in FIG. 1.
Figure 4:
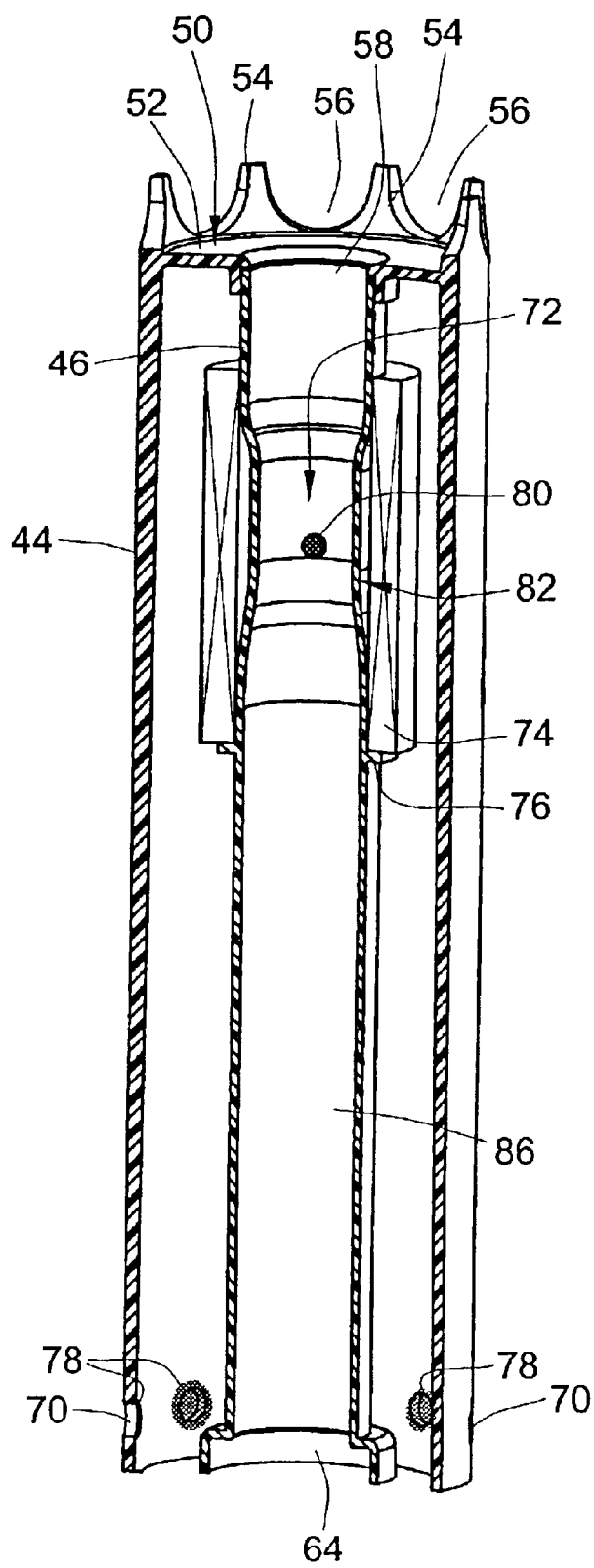
FIG. 4 is a cutaway isometric view of a reactor housing having a bypass filter element therein ready to be filled with acid neutralizing medium.
Figure 5:
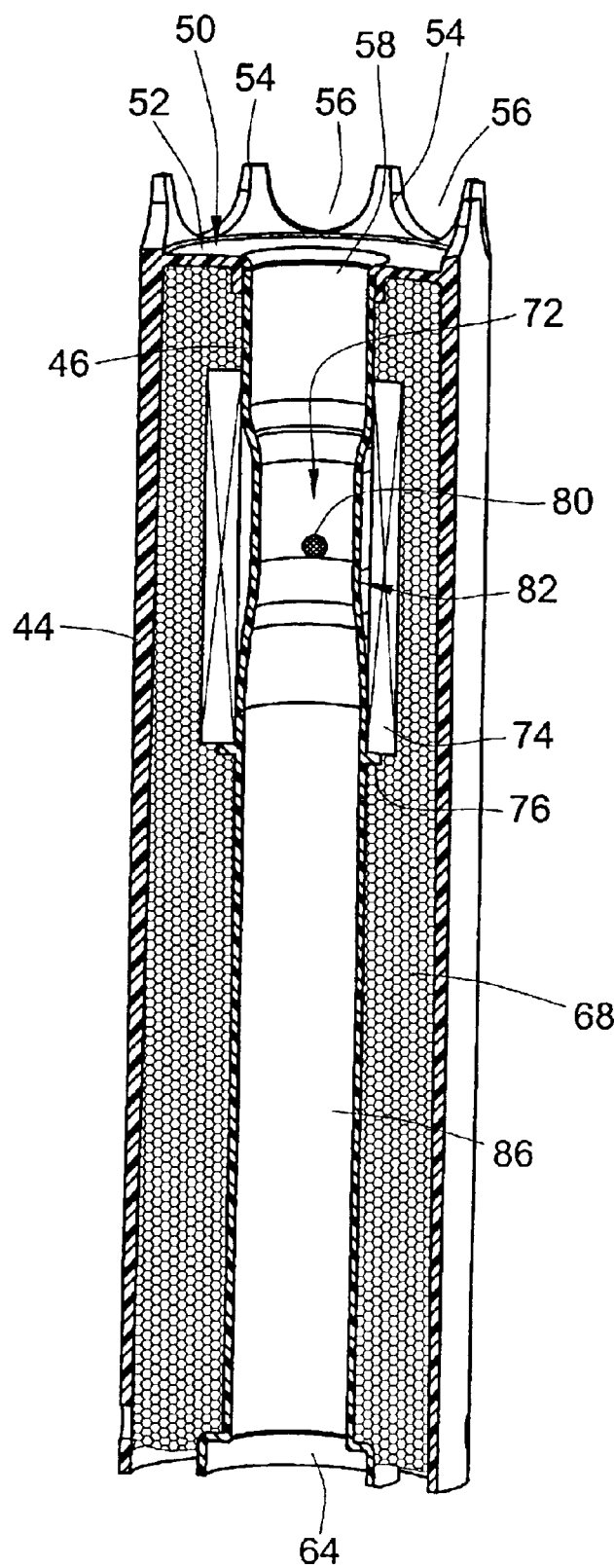
FIG. 5 is a view similar to FIG. 4 but with the reactor housing filled with a bed of crushed limestone particles.
Figure 6:
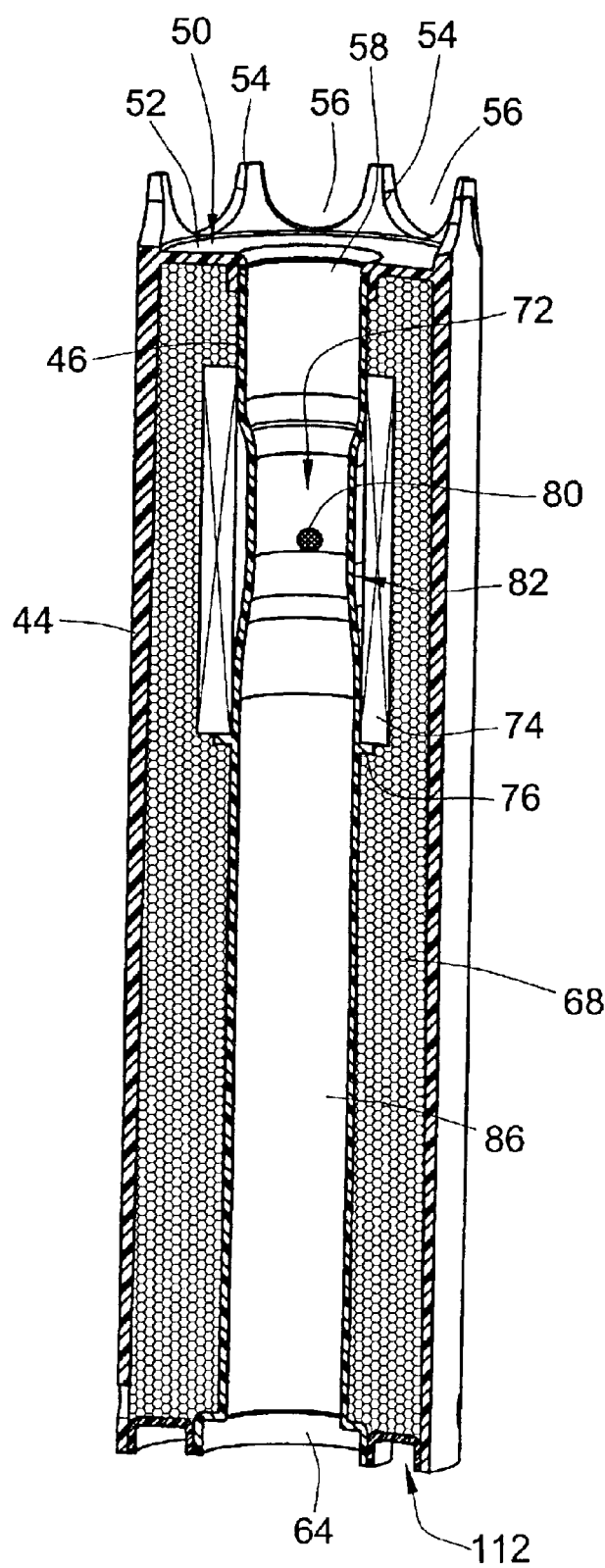
FIG. 6 is a view similar to FIG. 5 with the additional component of a reactor retaining cap installed.

Assembly of the filter cartridge according to a preferred embodiment can generally be gathered by viewing FIGS. 2–8 and then FIG. 1 in sequence. Referring to FIG. 2, the reactor housing starts with or is built off of the venturi tube 46 as is shown in FIG. 2. The bypass filter 74 is then inserted over the venturi tube and then mechanically or chemically adhered to the venturi tube 46 in a region around the one or more venturi outlet ports 72, as shown in FIG. 3 to provide a seal between the two. The bypass element 74 may either be a depth filtration tube or pleat media. The assembled venturi tube 46 and bypass filter 74 combination is then assembled into the reactor housing 44 either by mechanically or chemically welding the components, again to provide a seal as shown in FIG. 4. The reactor housing 44 is then ready to be filled with the reactant, which is preferably a material comprising primarily calcium carbonate material such as may be provided by crushed limestone particles 68 as shown in FIG. 5. Once the reactor housing is filled with the reactant, the acid neutralizing particles must be retained within the housing to allow the reactor housing to be transported. FIG. 6 shows one method of enclosing and containing the acid neutralizing particles 68 utilizing an annular retaining cap 112 that is fixed into place either by pressing into place or by means of bonding. An alternative method would be to dispense a potting material to fill the gap between the venturi tube 46 and the reactor housing 44, thus containing the acid neutralizing particles 68. Once this is done, the acid neutralizing reactor 40 is complete and is ready to be assembled into a filter cartridge.

Figure 7:
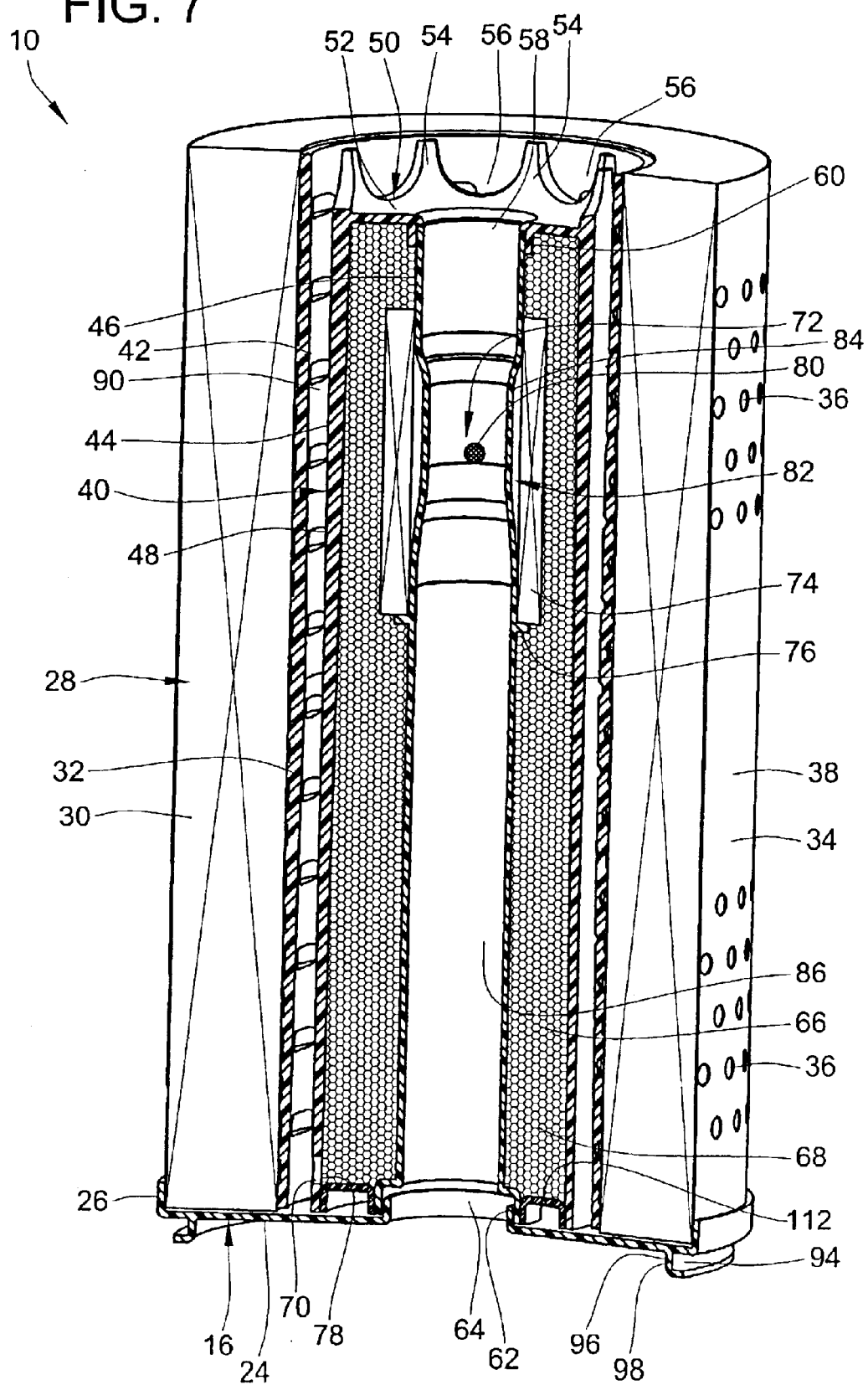
FIG. 7 is a cutaway isometric view of the completed acid neutralizing reactor and full flow particulate filter joined to a bottom end cap.
Figure 8:
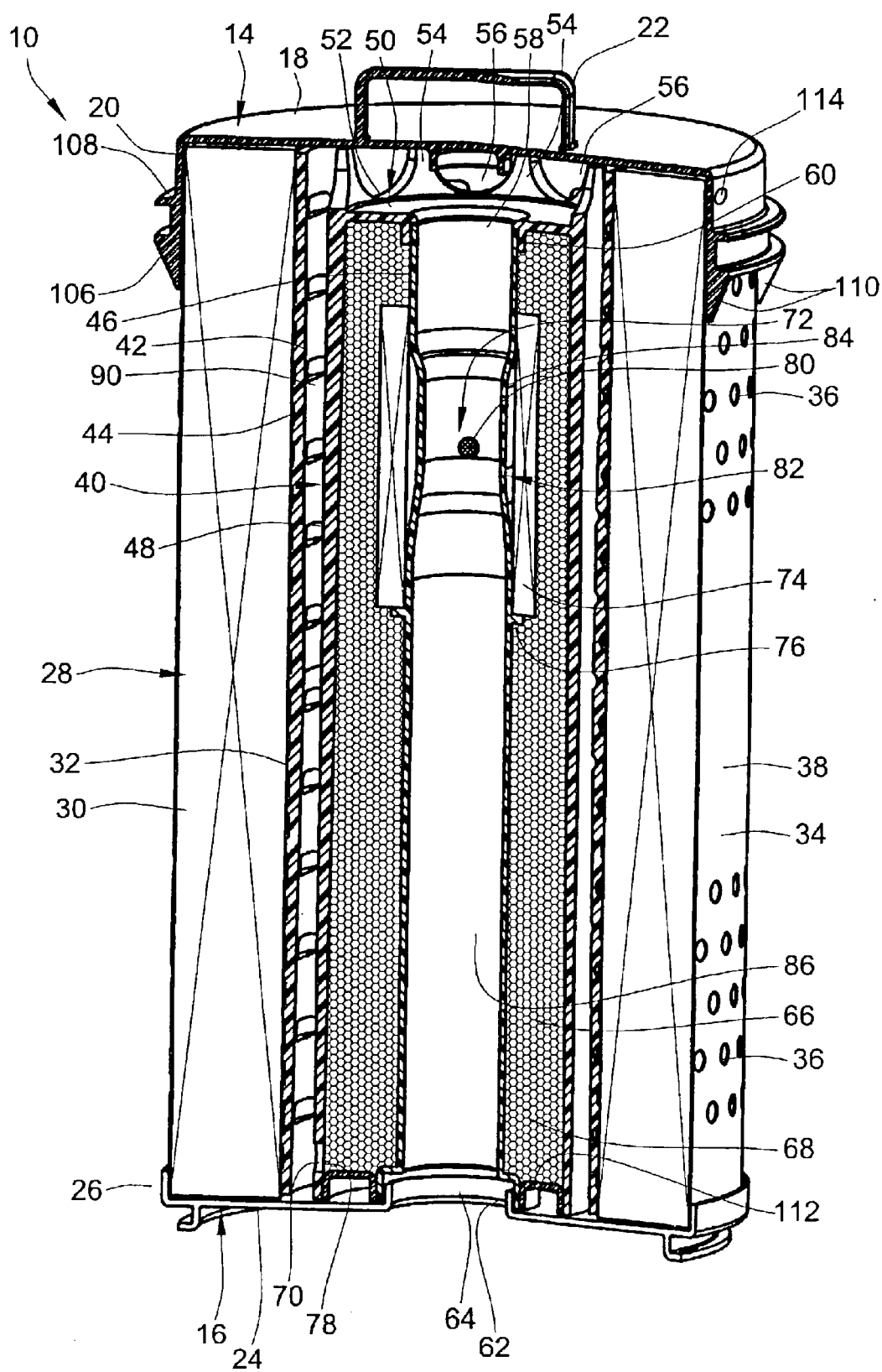
FIG. 8 is a view similar to FIG. 7 but with a top end cap installed and joined over the top ends of the reactor housing and full flow particulate filter.
Figure 10:
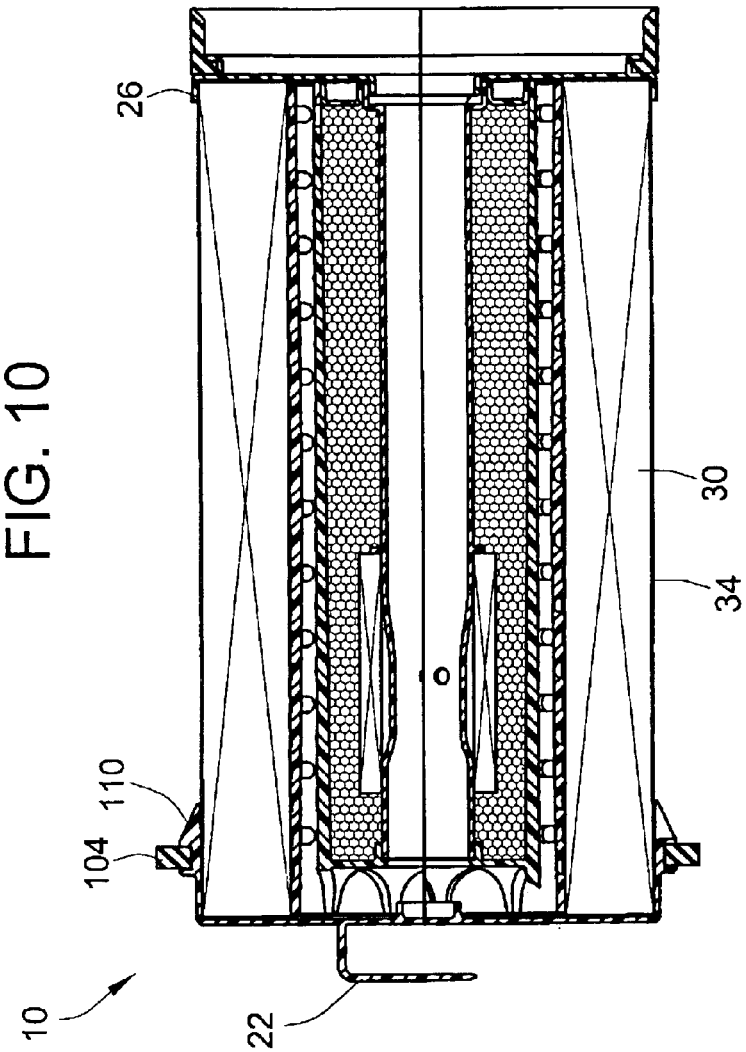
FIGS. 9 and 10 are an end view and cross sectional view taken about line 10—10 of a completed environmentally friendly acid neutralizing full flow cartridge.
Figure 9:
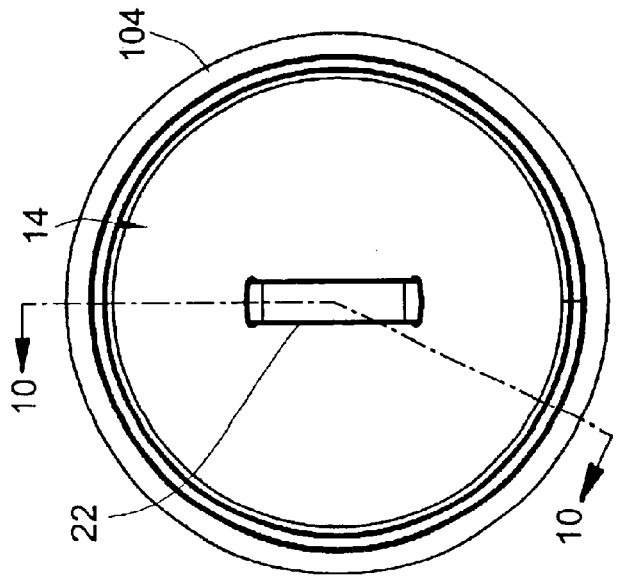

The assembly of the filter cartridge starts with potting the assembled reactor 40, the full flow filter element 28 (including filter media 30, perforated plastics inner tube 32 and perforated wrapper 34) in the bottom end cap 16, as shown in FIG. 7. As discussed above, the potting material could be plastisol, epoxy, urethane, hot melt, or other suitable bonding material. The filter media 30 for the full flow filter element is made from but not limited to pleated cellulous filter paper, synthetic material, glass or a blend of materials, or a depth filtration tube, or other suitable filtration media. The outer wrapper 34 protects the full flow filter element and more specifically the filter media 30 from direct oil flow as it enters the cartridge housing when installed as shown in FIG. 12 (see e.g. direction of incoming flow via inlet passage 164).

A similar potting material is used in the top end cap 14 to assemble the rest of the filter cartridge 10 as shown in FIG.

8. The top and bottom gaskets 92, 104 can then be installed in their corresponding retaining grooves 98, 106 that are integrally provided by the top and bottom end caps 14, 16 as shown in FIG. 1. One or more vent holes 114 may optionally be provided through the top end cap to provide for pressure equalization above the lid gasket if needed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An environmentally friendly acid neutralizing filter cartridge for mounting in a cartridge mounting body of an engine oil circuit for filtering particulates and neutralizing acid in oil, the filter cartridge comprising:
    a support housing adapted to be mounted in the cartridge mounting body, the support housing comprising substantially no metal parts such that the filter cartridge can be incinerated;
    a full flow particulate filter arranged in the support housing;
    a bypass particulate filter arranged in the support housing;
    a bed of acid neutralizing particles contained in the support housing;
    a predetermined primary flow path defined through the filter cartridge passing through the full flow particulate filter and bypassing the bed of acid neutralizing particles;
    a predetermined bypass path defined through the filter cartridge passing, in sequence, through the bed of acid neutralizing particles and the bypass particulate filter; and
    wherein the filter cartridge includes an outer annular periphery extending axially between a pair of axially spaced ends, wherein a fluid inlet is provided at the outer annular periphery and a fluid outlet is through one of the ends, such that fluid enters the filter cartridge through the outer annular periphery.

2. The environmentally friendly acid neutralizing filter cartridge of claim 1, further comprising a constriction arranged to create a pressure differential across the bed of acid neutralizing particles and the bypass particulate filter for propelling oil therethrough.

3. An environmentally friendly acid neutralizing filter cartridge for mounting in a cartridge mounting body of an engine oil circuit for filtering particulates and neutralizing acid in oil, the filter cartridge comprising:
    a support housing adapted to be mounted in the cartridge mounting body, the support housing comprising substantially no metal parts such that the filter cartridge can be incinerated;
    a full flow particulate filter arranged in the support housing;
    a bypass particulate filter arranged in the support housing;
    a bed of acid neutralizing particles contained in the support housing;
    a predetermined primary flow path defined through the filter cartridge passing through the full flow particulate filter and bypassing the bed of acid neutralizing particles;
    a predetermined bypass path defined through the filter cartridge passing, in sequence, through the bed of acid neutralizing particles and the bypass particulate filter;
    further comprising a constriction arranged to create a pressure differential across the bed of acid neutralizing particles and the bypass particulate filter for propelling oil therethrough; and
    wherein the predetermined bypass path also passes through the full flow particulate filter.

4. The environmentally friendly acid neutralizing filter cartridge of claim 1, wherein the support housing includes top and bottom non-metallic end caps and a non-metallic acid neutralizing reactor containing the bed of acid neutralizing particles secured axially between the top and bottom end caps providing axial support to the environmentally friendly acid neutralizing filter cartridge.

5. The environmentally friendly acid neutralizing filter cartridge of claim 4, wherein the reactor body includes an outer annular wall portion, a central tube portion, and a spacer portion, the reactor defining a reactor chamber containing the bed of acid neutralizing particles between the between the outer annular wall portion and a central tube portion, the outer annular wall portion defining at least one reactor inlet port, the central tube portion defining at least one reactor outlet port, the central tube portion having an entrance opening spaced from the top end cap by the spacer portion and an exit opening communicating with an outlet opening formed in the bottom end cap, the spacer defining a passageway bypassing the reactor chamber.

6. The environmentally friendly acid neutralizing filter cartridge of claim 5, wherein the reactor body comprises a plurality of parts molded of plastic material assembled together including an outer reactor housing unitarily providing the spacer portion and the outer annular wall, and a separate center tube integrally connected to the spacer portion of the reactor housing to enclose a top end of the reactor chamber.

7. The environmentally friendly acid neutralizing filter cartridge of claim 6, wherein said a plurality of parts molded of plastic material further includes a reactor cap extending radially between the outer reactor housing and the center tube to enclose the bottom end of the reactor chamber.

8. The environmentally friendly acid neutralizing filter cartridge of claim 5, wherein top and bottom ends of the reactor housing are potted to the top and bottom end caps.

9. The environmentally friendly acid neutralizing filter cartridge of claim 8, the full flow particulate filter includes a generally cylindrical tube of filter media surrounding the reactor body potted into the top and bottom end caps.

10. The environmentally friendly acid neutralizing filter cartridge of claim 5, wherein the central tube portion defines a constricted portion adapted to create a pressure differential across the reactor housing, the at least one reactor outlet port arranged along the constricted portion.

11. The environmentally friendly acid neutralizing filter cartridge of claim 5, wherein the at least one reactor outlet port and the at least one reactor inlet port are radially spaced and axially spaced proximate opposed ends of the filter cartridge thereby imparting substantial radial and axial components on the predetermined bypass path through the reactor chamber.

12. The environmentally friendly acid neutralizing filter cartridge of claim 5, further comprising mesh screen material integrally molded over the at least one reactor inlet port for preventing acid neutralizing particles from escaping from the reactor housing.

13. The environmentally friendly acid neutralizing filter cartridge of claim 4, wherein the top and bottom ends of the reactor are potted to the top and bottom end caps, and wherein the full flow particulate filter includes a generally cylindrical tube of filter media surrounding the reactor body potted into the top and bottom end caps.

14. The environmentally friendly acid neutralizing filter cartridge of claim 13, further comprising a bottom annular gasket externally carried by the bottom end cap configured and arranged to prevent oil from short circuiting the filter cartridge.

15. The environmentally friendly acid neutralizing filter cartridge of claim 14, further comprising a top annular gasket externally carried by the top end cap.

16. The environmentally friendly acid neutralizing filter cartridge of claim 14, wherein the full flow particulate filter further comprises a perforated center tube supporting the inner radial periphery of the generally cylindrical tube of filter media.

17. The environmentally friendly acid neutralizing filter cartridge of claim 16, further comprising a generally cylindrical wrapper surrounding the generally cylindrical tube of filter media, the wrapper including perforations.

18. The environmentally friendly acid neutralizing filter cartridge of 17, wherein the wrapper includes a solid unperforated intermediate portion separating top and bottom perforated portions, arranged and configured to prevent oil from impacting a central region of the generally cylindrical tube of filter media.

19. An environmentally friendly acid neutralizing filter cartridge for filtering particulates and neutralizing acid in oil, the filter cartridge comprising:
top and bottom end caps;
a generally cylindrical full flow particulate filter secured axially between the top and bottom end caps;
a reactor body extending axially between the top and bottom end caps, the reactor body comprising a reactor chamber and a venturi conduit, the reactor chamber having at least one reactor inlet port and at least one reactor outlet port, the venturi conduit including a constricted portion, the at least one outlet port arranged relative to the constricted portion such that when fluid flows through the venturi conduit, fluid is drawn through the at least one reactor outlet port;
a bed of acid neutralizing particles in the reactor chamber between the at least one reactor inlet port and the at least one reactor outlet port; and
a second filter arranged downstream of the bed of acid neutralizing particles for preventing acid neutralizing particles from exiting the filter cartridge during use.

20. The environmentally friendly acid neutralizing filter cartridge of claim 19, wherein the second filter element is a bypass filter element arranged between bed of acid neutralizing particles and the at least one reactor outlet port.

21. The environmentally friendly acid neutralizing filter cartridge of claim 19, wherein the reactor body is arranged generally concentric within the full flow particulate filter, wherein an annular collection chamber is defined between the reactor body and the full flow particulate filter, and wherein a radial passageway generally between to the reactor body and the top end cap connects the annular chamber with the venturi conduit.

22. The environmentally friendly acid neutralizing filter cartridge of claim 21, wherein the reactor body includes a spacer portion defining radial through ports potted into the top end cap, the spacer portion axially spacing the reactor chamber from the top end cap.

23. The environmentally friendly acid neutralizing filter cartridge of claim 22, wherein the reactor body comprises a plurality of parts molded of plastic material assembled together including an outer reactor housing unitarily providing the spacer portion and an outer cylindrical wall that defines the at least one inlet port, and a separate center tube integrally connected to the spacer portion of the reactor housing to enclose a top end of the reactor chamber, the center tube generally concentric with the outer cylindrical wall, the center tube providing the venturi conduit.

24. The environmentally friendly acid neutralizing filter cartridge of claim 23, wherein said a plurality of parts molded of plastic material further includes a reactor cap extending radially between the outer reactor housing and the center tube to enclose the bottom end of the reactor chamber, the reactor cap and bottom ends of the reactor housing and center tube portion being potted to the bottom end cap.

25. The environmentally friendly acid neutralizing filter cartridge of claim 19, wherein the at least one inlet port and the at least one outlet port are radially spaced and axially spaced proximate opposed ends of the filter cartridge thereby imparting substantial radial and axial components flow through the reactor chamber.

26. The environmentally friendly acid neutralizing filter cartridge of claim 21, further comprising mesh screen material over the at least one inlet port for preventing acid neutralizing particles from escaping from the reactor chamber.

27. The environmentally friendly acid neutralizing filter cartridge of claim 19, wherein the top and bottom ends of the reactor body are potted to the top and bottom end caps, and wherein the generally cylindrical full flow particulate filter is potted into the top and bottom end caps.

28. The environmentally friendly acid neutralizing filter cartridge of claim 19, further comprising a bottom annular gasket externally carried by the bottom end cap configured and arranged to prevent oil from short circuiting the filter cartridge.

29. The environmentally friendly acid neutralizing filter cartridge of claim 28, further comprising a top annular gasket externally carried by the top end cap.

30. The environmentally friendly acid neutralizing filter cartridge of claim 19, wherein the top end cap includes a vent port therethough communicating fluid on both sides of the top annular gasket for equalizing pressure on opposed sides of the top end cap.

31. The environmentally friendly acid neutralizing filter cartridge of claim 19, wherein the full flow particulate filter comprises a tube of filter media and a cylindrical perforated center tube supporting the inner radial periphery of the tube of filter media.

32. The environmentally friendly acid neutralizing filter cartridge of claim 31, full flow particulate filter further includes a generally cylindrical wrapper surrounding the generally cylindrical tube of filter media, the wrapper including perforations.

33. The environmentally friendly acid neutralizing filter cartridge of claim 32, wherein the wrapper includes a solid unperforated intermediate portion separating top and bottom perforated portions, arranged and configured to prevent oil from impacting a central region of the generally cylindrical tube of filter media.

34. The environmentally friendly acid neutralizing filter cartridge of claim 19, wherein the acid neutralizing particles comprise primarily calcium carbonate.

35. The environmentally friendly acid neutralizing filter cartridge of claim 34, wherein the acid neutralizing particles comprise crushed limestone particles.

36. An environmentally friendly acid neutralizing filter cartridge for filtering particulates and neutralizing acid in oil, the environmentally friendly acid neutralizing filter comprising substantially no metal parts such that the support housing can be incinerated, the filter cartridge comprising:
   top and bottom plastic end caps, the bottom end cap defining a main outlet;
   a generally cylindrical full flow particulate filter having opposed ends potted into the top and bottom end caps respectively;
   a plastic reactor body having opposed ends potted into the top and bottom end caps respectively, the plastic reactor body arranged generally concentric within the generally cylindrical full flow particulate filter such that an annular collection chamber is defined therebetween, plastic reactor body including an annular outer wall portion, a central tube portion arranged generally concentric inside the annular outer wall portion to provide a reaction chamber therebetween, and a spacer portion, the central tube portion have a top opening spaced axially from the top end cap and a bottom opening communicating with the main outlet, the spacer portion defining a radially extending fluid passageway connecting the annular collection chamber with the top opening, the annular outer wall portion defining at least one reactor inlet port, the central tube portion defining at least one reactor outlet port, and wherein a constricted portion is arranged along the central tube portion, the at least one reactor outlet port arranged along the constricted portion such that when fluid flows through the center tube portion, fluid is drawn through the at least one outlet port;
   a bed of acid neutralizing particles in the reactor chamber between the at least one reactor inlet port and the at least one reactor outlet port; and
   a bypass filter in reaction chamber between the bed of acid neutralizing particles and the at least one reactor outlet port.

37. The environmentally friendly acid neutralizing filter cartridge of claim 36, wherein the acid neutralizing particles comprise primarily calcium carbonate.

38. The environmentally friendly acid neutralizing filter cartridge of claim 37, wherein the acid neutralizing particles comprise crushed limestone particles.

39. The environmentally friendly acid neutralizing filter cartridge of claim 36, further comprising a bottom annular gasket externally carried by the bottom end cap configured and arranged to prevent oil from short circuiting the filter cartridge.

40. The environmentally friendly acid neutralizing filter cartridge of claim 39, further comprising a top annular gasket externally carried by the top end cap.

41. The environmentally friendly acid neutralizing filter cartridge of claim 40, wherein the top end cap includes a vent port therethough communicating fluid on both sides of the top annular gasket for equalizing pressure on opposed sides of the top end cap.

42. The environmentally friendly acid neutralizing filter cartridge of claim 41, wherein the reactor body comprises a plurality of parts molded of plastic material assembled together including an outer reactor housing unitarily providing the spacer portion and the outer annular wall that defines the at least one reactor inlet port, and center tube integrally connected to the spacer portion of the reactor housing to enclose a top end of the reactor chamber.

43. The environmentally friendly acid neutralizing filter cartridge of claim 42, wherein said a plurality of parts molded of plastic material further includes a reactor cap extending radially between the outer reactor housing and the center tube to enclose the bottom end of the reactor chamber, the reactor cap and bottom ends of the reactor housing and center tube portion being potted to the bottom end cap around the main outlet.

44. The environmentally friendly acid neutralizing filter cartridge of claim 36, wherein the full flow particulate filter further comprises a tube of filter media and a cylindrical perforated center tube supporting the inner radial periphery of the tube of filter media.

45. The environmentally friendly acid neutralizing filter cartridge of claim 44, wherein the full flow particulate filter further includes a generally cylindrical wrapper surrounding the generally cylindrical tube of filter media, the wrapper including perforations.

46. The environmentally friendly acid neutralizing filter cartridge of claim 45, wherein the wrapper includes a solid unperforated intermediate portion separating top and bottom perforated portions, arranged and configured to prevent oil from impacting a central region of the generally cylindrical tube of filter media.

* * * * *